(12) United States Patent
Yamada et al.

(10) Patent No.: US 7,510,998 B2
(45) Date of Patent: Mar. 31, 2009

(54) SILICON GREASE COMPOSITIONS

(75) Inventors: Kunihiro Yamada, Usui-gun (JP); Akihiro Endo, Usui-gun (JP); Kunihiko Mita, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 641 days.

(21) Appl. No.: 11/133,339

(22) Filed: May 20, 2005

(65) Prior Publication Data

US 2005/0261140 A1 Nov. 24, 2005

(30) Foreign Application Priority Data

May 21, 2004 (JP) .............................. 2004-151706
Oct. 14, 2004 (JP) .............................. 2004-299616

(51) Int. Cl.
*C10M 125/04* (2006.01)
*C10M 173/02* (2006.01)
*C08L 79/08* (2006.01)

(52) U.S. Cl. ..................... 508/150; 508/121; 508/123

(58) Field of Classification Search ................ 508/150, 508/121, 123
See application file for complete search history.

(56) References Cited

U.S. PATENT DOCUMENTS

| 3,885,984 | A | 5/1975 | Wright |
| 4,265,775 | A | 5/1981 | Aakalu et al. |
| 6,174,841 | B1 | 1/2001 | Yamada et al. |
| 2002/0014692 | A1* | 2/2002 | Yamada et al. ............... 257/712 |
| 2005/0261140 | A1 | 11/2005 | Yamada et al. |

FOREIGN PATENT DOCUMENTS

| EP | 0 813 244 A2 | 12/1997 |
| EP | 1 352 947 A1 | 10/2003 |
| JP | 50-105573 | 8/1975 |
| JP | 51-55870 | 5/1976 |
| JP | 52-33272 | 8/1977 |
| JP | 56-28264 | 3/1981 |
| JP | 59-52195 | 12/1984 |
| JP | 61-157587 | 7/1986 |
| JP | 2-153995 | 6/1990 |
| JP | 3-14873 | 1/1991 |
| JP | 9-100394 | 4/1997 |
| JP | 10-110179 | 4/1998 |
| JP | 11-246884 | 9/1999 |
| JP | 2000-63872 | 2/2000 |
| JP | 2000-63873 | 2/2000 |
| JP | 2000-109373 | 4/2000 |
| JP | 2000-169873 | 6/2000 |
| JP | 2002-3718 | 1/2002 |
| JP | 2002-30217 | 1/2002 |
| JP | 2002-327116 | 11/2002 |
| JP | 2003-301189 | 10/2003 |
| JP | 2004-75760 | 3/2004 |
| JP | 2004-91743 | 3/2004 |

OTHER PUBLICATIONS

Web page article on thermal conductivity (see attached pdf.*
U.S. Appl. No. 11/616,185, filed Dec. 26, 2006, Endo et al.
U.S. Appl. No. 11/776,124, filed Jul. 11, 2007, Endo et al.

* cited by examiner

*Primary Examiner*—Walter D Griffin
*Assistant Examiner*—Frank C Campanell
(74) *Attorney, Agent, or Firm*—Oblon, Spivak, McClelland, Maier & Neustadt, P.C.

(57) ABSTRACT

A silicone grease composition is provided comprising (A) 2-40% by weight of an organopolysiloxane having a kinematic viscosity of 50-500,000 mm$^2$/s at 25° C., and (B) 60-98% by weight of at least one heat conductive filler selected from among metal powders, metal oxide powders and ceramic powders having a thermal conductivity of at least 10 W/m° C. and an average particle size of 0.1-15.0 μm. Coarse particles are removed such that a 500-mesh oversize fraction is not more than 50 ppm and a 325-mesh oversize fraction is substantially zero.

11 Claims, No Drawings

SILICON GREASE COMPOSITIONS

CROSS-REFERENCE TO RELATED APPLICATION

This non-provisional application claims priority under 35 U.S.C. §119(a) on Patent Application Nos. 2004-151706 and 2004-299616 filed in Japan on May 21, 2004 and Oct. 14, 2004, respectively, the entire contents of which are hereby incorporated by reference.

TECHNICAL FIELD

This invention relates to heat dissipating silicone grease compositions having improved heat dissipation and heat transfer.

BACKGROUND ART

During use, many electronic components generate heat. For proper functioning of the electronic component, it is necessary to remove the heat from the component. In particular, advanced integrated circuit devices like CPU in personal computers produce increased amounts of heat due to the acceleration of processing speed. Thus thermal management is of significance.

For heat removal, a number of methods and a variety of heat conductive materials have been proposed. The heat conductive materials generally take two forms, a sheet form which is easy to handle and a paste form commonly known as heat dissipating grease. Since the thermal resistance of a heat dissipating material is in proportion to its thickness, the heat dissipating grease which can be readily thinned by compression has better heat dissipating properties. For electronic components with more heat generation, it is proposed to dispose a heat conductive grease or sheet between the electronic component and a heat sink for efficiently releasing the heat from the electronic component (see JP-A 56-28264 or Aakalu et al. U.S. Pat. No. 4,265,775 and JP-A 61-157587).

However, since the heat release of electronic devices such as LSI is increasing, conventional heat dissipating grease fails to provide satisfactory heat dissipation. The function of heat dissipating grease may be enhanced by heavier loading of heat conductive filler. The heavier loading of heat conductive filler, however, increases the viscosity of grease. The necessary ease of application poses a certain limit to the filler loading. Another approach is to reduce the coating thickness of heat dissipating grease because its thermal resistance is proportional to its thickness. To this end, a heat conductive filler having a smaller average particle size is generally used although no satisfactory heat dissipating effect is yet available. This is because the heat conductive filler, despite a smaller average particle size, often contains incidental coarse particles which prevent the heat dissipating grease from being coated to the desired thickness.

Known heat conductive materials include a heat dissipating grease based on silicone fluid which is loaded with zinc oxide or alumina powder (see JP-B 52-33272 and JP-B 59-52195).

The use of aluminum nitride powder for improving heat transfer is also known. U.S. Pat. No. 4,265,775 discloses a thixotropic thermally conductive material comprising a liquid organo-silicone carrier, silica fibers, and one or more thermal filler powders selected from among dendritic zinc oxide, lamellar aluminum nitride, and lamellar boron nitride. JP-A 2-153995 discloses a silicone grease composition comprising a specific organopolysiloxane and a spherical hexagonal aluminum nitride powder having a certain particle size range. JP-A 3-14873 discloses a heat conductive silicone grease using a combination of an aluminum nitride powder having a smaller particle size with an aluminum nitride powder having a larger particle size. JP-A 10-110179 discloses a heat conductive silicone grease using a combination of an aluminum nitride powder with a zinc oxide powder. JP-A 2000-63872 discloses a heat conductive grease composition using an aluminum nitride powder which has been surface treated with organosilane.

Aluminum nitride has a thermal conductivity of 70 to 270 W/mK while one typical material having a higher thermal conductivity is diamond having a thermal conductivity of 900 to 2,000 W/mK. JP-A 2002-30217 discloses a heat conductive silicone composition comprising a silicone resin, diamond, zinc oxide, and a dispersant.

Metals have a high thermal conductivity and may be used where the electrical insulation of electronic components is unnecessary. JP-A 2000-63873 discloses a heat conductive grease composition comprising a base fluid such as silicone fluid in admixture with a metallic aluminum powder.

However, all these heat conductive materials and heat conductive greases fail to comply with the increased heat release of advanced IC devices such as CPU.

A material based on a silicone fluid filled with a heat conductive filler has a thermal conductivity which is little dependent on the thermal conductivity of the filler if the volume fraction of the filler is equal to or less than 0.6, as understood from the theoretical equation of Maxwell or Bruggeman. The thermal conductivity of the filler becomes significant only when the volume fraction of the filler is in excess of 0.6. This suggests that an increase in the thermal conductivity of heat conductive grease is first dependent on how to heavily load the grease with a heat conductive filler and if heavy loading is possible, how to select a filler having a higher thermal conductivity. However, the heavy loading interferes with the flow of heat conductive grease and detrimentally affects the efficiency of application like coating and dispensing, making the grease unacceptable on practical use.

The other approach is to reduce the coating thickness of heat dissipating grease because its thermal resistance is proportional to its thickness. To this end, a heat conductive filler having a smaller average particle size, with coarse particles cut off, is used although no satisfactory heat dissipating effect is yet available. This is because the heat conductive filler having a smaller average particle size has a larger surface area, which allows for progress of oxidation if the filler is of metal. As a result, the thermal conductivity of filler is reduced, and heavy loading becomes difficult. It is then difficult to impart a high thermal conductivity.

JP-A 2004-091743 discloses a heat conductive grease comprising 15 to 35% by weight of an organopolysiloxane, 35 to 55% by weight of a spherical alumina powder having an average particle size of 0.2 μm to less than 1.0 μm, and 30 to 50% by weight of an aluminum nitride powder having an average particle size of 1 to 3 μm and a maximum particle size of 2 to 10 μm.

SUMMARY OF THE INVENTION

An object of the present invention is to provide a heat dissipating silicone grease composition having improved heat dissipating effect. Another object is to provide a heat conductive silicone grease composition having improved heat transfer.

The present invention pertains to a silicone grease composition comprising (A) an organopolysiloxane of the average compositional formula (1) defined below having a kinematic viscosity of 50 to 500,000 mm²/s at 25° C., and (B) a major proportion of a heat conductive filler selected from among metal powders, metal oxide powders and ceramic powders having a thermal conductivity of at least 10 W/m° C. and an average particle size of 0.1 to 15.0 µm. It has been found that if coarse particles are removed from the filler such that a fraction of coarse particles on 500 mesh (sieve opening 25 µm) is not more than 50 ppm based on the composition and a fraction of coarse particles on 325 mesh (sieve opening 45 µm) is substantially zero, then the silicone grease composition can be applied as a coating having a sufficiently reduced thickness to exert an excellent heat dissipating effect.

The present invention also pertains to a silicone grease composition comprising an organopolysiloxane fluid as above and a copper powder having an average particle size of 5.0 to 15.0 µm and containing not more than 0.1% by weight of oxygen. It has also been found that if coarse particles are removed from the powder such that a fraction of coarse particles on 500 mesh (sieve opening 25 µm) is not more than 50 ppm based on the composition and a fraction of coarse particles on 325 mesh (sieve opening 45 µm) is substantially zero, then the silicone grease composition can be applied as a coating having a sufficiently reduced thickness to exert excellent heat transfer and heat dissipation.

In a first aspect, the present invention provides a silicone grease composition comprising (A) 2 to 40% by weight of an organopolysiloxane of the average compositional formula (1):

wherein $R^1$ is independently a monovalent $C_1$-$C_{18}$ hydrocarbon group, and "a" is a positive number from 1.8 to 2.2, having a kinematic viscosity of 50 to 500,000 mm²/s at 25° C., and (B) 60 to 98% by weight of at least one heat conductive filler selected from the group consisting of metal powders, metal oxide powders and ceramic powders, the filler having a thermal conductivity of at least 10 W/m° C. and an average particle size of 0.1 to 15.0 µm, wherein a fraction of coarse particles on 500 mesh (sieve opening 25 µm) is not more than 50 ppm based on said composition and a fraction of coarse particles on 325 mesh (sieve opening 45 µm) is substantially zero.

In a second aspect, the present invention provides a silicone grease composition comprising (A) 10 to 60% by volume of an organopolysiloxane of the average compositional formula (1) defined above, having a kinematic viscosity of 50 to 100,000 mm²/s at 25° C., and (C-1) 40 to 90% by volume of a copper powder having an average particle size of 5.0 to 15.0 µm and containing not more than 0.1% by weight of oxygen, wherein a fraction of coarse particles on 500 mesh (sieve opening 25 µm) is not more than 50 ppm based on said composition and a fraction of coarse particles on 325 mesh (sieve opening 45 µm) is substantially zero.

The silicone grease compositions of the invention exert an excellent heat dissipating effect.

DESCRIPTION OF THE PREFERRED EMBODIMENTS

First Embodiment

The first embodiment of the present invention is a heat dissipating silicone grease composition comprising (A) an organopolysiloxane and (B) a heat conductive filler.

The organopolysiloxane used herein as component (A) has the average compositional formula (1).

In formula (1), $R^1$ is independently selected from monovalent $C_1$-$C_{18}$ hydrocarbon groups. Suitable groups include alkyl groups such as methyl, ethyl, propyl, hexyl, octyl, decyl, dodecyl, tetradecyl, hexadecyl, and octadecyl; cycloalkyl groups such as cyclopentyl and cyclohexyl; alkenyl groups such as vinyl and allyl; aryl groups such as phenyl and tolyl; aralkyl groups such as 2-phenylethyl and 2-methyl-2-phenylethyl; halogenated hydrocarbon groups such as 3,3,3-trifluoropropyl, 2-(perfluorobutyl)ethyl, 2-(perfluorooctyl)ethyl and p-chlorophenyl. Of these, phenyl and $C_6$-$C_{18}$, especially $C_6$-$C_{14}$ alkyl groups are preferred, with phenyl and methyl being most preferred. The letter "a" is a positive number from 1.8 to 2.2, and preferably from 1.9 to 2.2, when a viscosity required as a silicone grease composition is taken into account.

The organopolysiloxane should have a kinematic viscosity of 50 to 500,000 mm²/s at 25° C. and preferably 100 to 10,000 mm²/s at 25° C. With a kinematic viscosity of less than 50 mm²/S, a silicone grease composition based on that fluid is liable to oil bleeding. With a kinematic viscosity of more than 500,000 mm²/S, a silicone grease composition based on that fluid becomes less spreadable. As used herein, the kinematic viscosity is measured by an Ostwald viscometer.

In the silicone grease composition of the first embodiment, an amount of the organopolysiloxane (A) is 2 to 40% by weight, and preferably 3 to 15% by weight. A composition with less than 2% by weight of the organopolysiloxane loses grease nature and becomes less spreadable whereas a composition with more than 40% by weight of the organopolysiloxane loses a heat dissipation ability.

Component (B) is a heat conductive filler which should have a thermal conductivity of at least 10 W/m° C. If a filler with a thermal conductivity of less than 10 W/m° C. is used, a heat dissipating silicone grease composition also has a lower than desired thermal conductivity.

The heat conductive filler may be of any desired shape including irregular and spherical shapes although a spherical shape is preferred. The heat conductive filler should have an average particle size in the range of 0.1 to 15.0 µm and preferably 0.3 to 8.0 µm. With an average particle size of less than 0.1 µm, a composition loses grease nature and becomes less spreadable. An average particle size of more than 15.0 µm limits the thickness of a coating which is made of a silicone grease composition, reducing the heat dissipating effect. As used herein, the average particle size is measured by a particle size analyzer model MT3000 of Microtrac, Inc.

The heat conductive filler is selected from among metal powders, metal oxide powders, and ceramic powders. Suitable examples include aluminum powder, copper powder, silver powder, nickel powder, gold powder, aluminum oxide powder, zinc oxide powder, magnesium oxide powder, aluminum nitride powder, boron nitride powder, silicon nitride powder, diamond powder and carbon powder. Any desired filler can be selected from these powders as long as it has a thermal conductivity of at least 10 W/m° C. and an average particle size of 0.1-15.0 µm. A powder of one type or a mixture of two or more types may be used.

The particulate filler should satisfy that a fraction of coarse particles remaining on a 500-mesh sieve (sieve opening 25 µm) be not more than 50 ppm based on the weight of the silicone grease composition and a fraction of coarse particles remaining on a 325-mesh sieve (sieve opening 45 μm) be substantially zero.

Manufacturers of fillers such as heat conductive fillers deliver their products with specifications where a measured particle size distribution is listed. Due to an extremely low level of absolute amount, however, coarse particles cannot be generally detected by a particle size distribution instrument. Consequently, even when particulate fillers of the same material and the same average particle size are used, a substantial difference in heat dissipating ability arises depending on whether or not coarse particles have been removed. Now that the heat generation of electronic components becomes substantial, it is very important to control the content of coarse particles in a heat conductive filler.

Several methods may be used to remove coarse particles from these heat conductive fillers. Typical methods are pneumatic classification and sieve classification. How to classify or size a particulate filler is not critical as long as a maximum number of coarse particles are removed. The heat conductive filler used herein is preferably subjected to sieve classification. The pneumatic classification has a certain probability of coarse particle removal, but is difficult to remove a maximum number of coarse particles. The sieve classification is advantageous in that using a 500-mesh sieve (sieve opening 25 μm), for example, the undersize fraction is substantially a heat conductive filler having a maximum particle size of 25 μm.

With respect to the loading of the heat conductive filler, the silicone grease composition should contain 60 to 98% by weight, preferably 80 to 95% by weight of the heat conductive filler. Less than 60% by weight of the heat conductive filler fails to provide the desired heat dissipating effect whereas a composition with more than 98% by weight of the filler loses grease nature and become less spreadable.

The heat dissipating silicone grease composition of the first embodiment is prepared by using an apparatus capable of kneading high viscosity materials such as a planetary mixer, combining and kneading components (A) and (B) on the apparatus at room temperature or an elevated temperature. Suitable agitating and mixing conditions include a temperature from room temperature to about 150° C., especially about 50 to 100° C. and a time of about 30 minutes to about 3 hours, especially about 1 to about 2 hours.

In the heat dissipating silicone grease composition of the first embodiment, various other additives may be compounded as long as they do not compromise the benefits of the invention.

Second Embodiment

The second embodiment is a silicone grease composition comprising (A) an organopolysiloxane and (C-1) a copper powder.

The organopolysiloxane used herein as component (A) is the same as the organopolysiloxane in the first embodiment except the viscosity range. The organopolysiloxane should have a kinematic viscosity of 50 to 100,000 mm$^2$/s at 25° C. and preferably 100 to 10,000 mm$^2$/s at 25° C. With a kinematic viscosity of less than 50 mm$^2$/s, a silicone grease composition based on that fluid is liable to oil bleeding. With a kinematic viscosity of more than 100,000 mm$^2$/s, a silicone grease composition based on that fluid becomes less flowable.

In the silicone grease composition of the second embodiment, an amount of the organopolysiloxane (A) is 10 to 60% by volume, and preferably 15 to 35% by volume. A composition with less than 10% by volume of the organopolysiloxane becomes hard, less flowable and less applicable whereas a composition with more than 60% by volume of the organopolysiloxane has a lower heat conductivity and allows the filler to settle out.

Component (C-1) is a copper powder having an average particle size of 5.0 to 15.0 μm. For heavy loadings in the organopolysiloxane (A), a copper powder of particles having a spherical or granular shape is preferred. Particles of a shape leading to a high bulk density such as dendritic, flake, needle or irregular particles are inadequate for the heavy loading purpose.

The copper powder should have an average particle size in the range of 5.0 to 15.0 μm and preferably 7.0 to 12.0 μm. A powder with an average particle size of less than 5.0 μm is difficult to fill in large amounts. An average particle size of more than 15.0 μm makes it difficult to reduce the thermal resistance through a reduction in coating thickness. As used herein, the average particle size is measured by a particle size analyzer model MT3000 by Microtrac, Inc.

Although copper is a good heat conductive material as demonstrated by a thermal conductivity of 398 W/mK, a copper powder tends to lower its thermal conductivity as oxidation readily proceeds on particle surfaces. In addition, surface oxidation exacerbates the particles' ability to be wetted with component (A) and creates irregularities on particle surfaces to increase the specific surface area. These are detrimental to heavy loading and thus prevent the silicone grease composition from being improved in thermal conductivity. As the particle size becomes smaller, the specific surface area becomes larger, exaggerating the deterioration of thermal conductivity and wettability of copper powder by surface oxidation. In this context, the copper powder having an average particle size of 5.0 to 15.0 μm should have an oxygen content of not more than 0.1% by weight, and preferably not more than 0.05% by weight. An oxygen content of more than 0.1% by weight hinders heavy loading through deteriorated wettability and increased surface area and also degrades heat transfer. The use of a copper powder with a minimized oxygen content enables heavy loading despite a small particle size and leads to an increased thermal conductivity. In the heat conductive silicone grease composition of the second embodiment, copper particles are covered on surfaces with the silicone so that further progress of oxidation is prohibited.

It is now described how to minimize the oxygen content of copper powder although the invention is not limited to this procedure. Since copper powder particles form copper oxide coatings on their surfaces when exposed to air, a greater surface area leads to a greater oxygen content. Then a copper powder having a greater size and a higher sphericity has a smaller surface area and hence, a lower oxygen content. A heat conductive silicone grease composition using a copper powder with a greater size is endowed with a higher thermal conductivity due to heavy loading of copper powder, but the thickness of its layer cannot be reduced on device mounting, with a failure to provide a heat dissipating effect. When a copper powder with a smaller size is used, its sphericity largely contributes to the oxygen content. The method of preparing a spherical powder having a high sphericity and a small surface area is a melt atomizing method of spraying a copper melt with the aid of a high velocity fluid, followed by solidification, but not limited thereto. Other exemplary methods include a method of removing oxide coatings on copper particle surfaces and a method using a flux component for covering particle surfaces for inhibiting contact with the air. Using an organic acid or resin-based flux, the oxygen content can be reduced.

It is noted that the oxygen concentration of a copper powder can be measured by the inert gas fusion-IR absorption spectroscopy of JIS Z2613.

With respect to the loading of the copper powder, the silicone grease composition should contain 40 to 90% by volume, preferably 50 to 85% by volume of the copper powder. A composition with less than 40% by volume of the copper powder has a lower thermal conductivity whereas a composition with more than 90% by volume of the copper powder becomes less flowable and less applicable.

In the silicone grease composition of the second embodiment, (C-2) a second heat conductive powder other than the copper powder (C-1) may be added for further improving heat transfer. Examples of the second powder include inorganic powders such as zinc oxide powder, aluminum oxide powder, boron nitride powder, aluminum nitride powder, silicon carbide powder and diamond powder, and metal powders such as silver powder, gold powder, nickel powder and stainless steel powder.

Of these, one or more heat conductive powders having an average particle size of 0.1 to 5.0 μm are preferably added because such fine particles enter interstices among the copper particles with which the silicone grease is filled, resulting in an increased filling factor. In addition, they improve the stability of the silicone grease composition, preventing oil separation. An average particle size of less than 0.1 μm corresponds to a greater bulk density which may interfere with heavy loading. An average particle size in excess of 5.0 μm partially overlaps the relatively large particle size of the copper powder, preventing close packing due to combination of fine and large particles. For this reason, the average particle size of the second powder is in a range of 0.1 to 5.0 μm and preferably 0.2 to 3.0 μm.

With respect to the loading of the second powder, the silicone grease composition should contain 0 to 35% by volume, preferably 1 to 35% by volume, and more preferably 5 to 30% by volume of the second powder (C-2). A composition with more than 35% by volume of the second powder becomes less flowable and less applicable. The amount of components (C-1) and (C-2) combined is preferably 60 to 90% by volume, and more preferably 70 to 85% by volume of the composition.

The heat conductive fillers including copper powder (C-1) and heat conductive powder (C-2) should satisfy that a fraction of coarse particles remaining on a 500-mesh sieve (sieve opening 25 μm) be not more than 50 ppm based on the weight of the silicone grease composition and a fraction of coarse particles remaining on a 325-mesh sieve (sieve opening 45 μm) be substantially zero.

The method of removing coarse particles from these heat conductive fillers is as set forth above in the first embodiment.

In the second embodiment, (D) a wetter may be optionally compounded. By treating surfaces of the heat conductive fillers including copper powder (C-1) and heat conductive powder (C-2) with the wetter, the powders are rendered more wettable with the base oil or organopolysiloxane (A) for assisting in heavy loading.

Component (D) includes (D-1) an alkoxysilane having the general formula (2).

Herein $R^2$ is a $C_9$-$C_{15}$ alkyl group such as nonyl, decyl, dodecyl and tetradecyl. An alkyl group of less than 9 carbon atoms fails to render the powder wettable. An alkoxysilane with an alkyl group of more than 15 carbon atoms is solid at room temperature and awkward to handle and may adversely affect the low-temperature performance of a composition.

$R^3$ is a monovalent $C_1$-$C_6$ hydrocarbon group. Examples include alkyl groups such as methyl, ethyl, propyl, hexyl and octyl, cycloalkyl groups such as cyclopentyl and cyclohexyl, alkenyl groups such as vinyl and allyl, aryl groups such as phenyl and tolyl, aralkyl groups such as 2-phenylethyl and 2-methyl-2-phenylethyl, and halogenated hydrocarbon groups such as 3,3,3-trifluoropropyl, 2-(perfluorobutyl)ethyl, 2-(perfluorooctyl)ethyl and p-chlorophenyl. Inter alia, methyl and ethyl are preferred.

$R^4$ is one or more $C_1$-$C_6$ alkyl groups such as methyl, ethyl, propyl, butyl, pentyl and hexyl, with methyl and ethyl being preferred.

The letter b is an integer of 1 to 3, and preferably 1; c is an integer of 0 to 2; and the sum of b+c is an integer of 1 to 3.

Examples of the alkoxysilane having formula (2) include $C_{10}H_{21}Si(OCH_3)_3$, $C_{12}H_{25}Si(OCH_3)_3$, $C_{10}H_{21}Si(CH_3)(OCH_3)_2$, $C_{10}H_{21}Si(C_6H_5)(OCH_3)_2$, $C_{10}H_{21}Si(CH_3)(OC_2H_5)_2$, $C_{10}H_{21}Si(CH=CH_2)(OCH_3)_2$, and $C_{10}H_{21}Si(CH_2CH_2CF_3)(OCH_3)_2$.

An appropriate amount of alkoxysilane (D-1) added is 0 to 5% by volume of the silicone grease composition of the second embodiment. Increasing the addition amount in excess of 5% by volume does not always enhance the wetting effect and is uneconomical. Since the alkoxysilane is somewhat volatile, the silicone grease composition will gradually become harder if it is allowed to stand in an open environment. A more appropriate amount of alkoxysilane (D-1) added is 0.1 to 3% by volume of the silicone grease composition.

The wetter component (D) also includes (D-2) a one end-trifunctional, hydrolyzable methylpolysiloxane having the general formula (3).

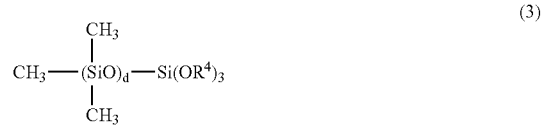

Herein $R^4$ is a $C_1$-$C_6$ alkyl group as exemplified above and d is an integer of 5 to 100 and preferably 10 to 60.

An appropriate amount of methylpolysiloxane (D-2) added is 0 to 10% by volume of the silicone grease composition of the second embodiment. A more appropriate amount of methylpolysiloxane (D-2) added is 0.1 to 5% by volume of the silicone grease composition because a composition containing a more proportion of component (D-2) may become less heat resistant.

It is acceptable to use both alkoxysilane (D-1) and one end-trifunctional, hydrolyzable methylpolysiloxane (D-2) as the wetter component (D). In this embodiment, the amount of component (A) and components (D-1) and (D-2) combined should preferably be not more than 40% by volume of the silicone grease composition.

In the second embodiment, various other additives, for example, heat resistance modifiers such as iron oxide and cerium oxide, viscosity modifiers such as silica, and colorants may be added as long as they do not compromise the benefits of the invention.

The heat conductive silicone grease composition of the second embodiment is prepared by mixing components (A) and (C-1) and optional components (C-2), (D), etc. on a suitable mixer such as a Trimix, Twinmix or Planetary Mixer (trade names of Inoue Mfg. Inc.), Ultra Mixer (trade name of Mizuho Industry Co., Ltd.), or Hivis Disper Mix (trade name of Tokushu Kika Kogyo Co., Ltd.) while optionally heating at about 50 to 150° C. The mixing is preferably followed by kneading under high shear forces for uniform finishing. Suitable kneaders include a three-roll mill, colloid mill and sand grinder, with the three-roll mill being preferred.

Coarse Particles

In the silicone grease compositions of the first and second embodiments, if a fraction of coarse particles on 500 mesh (sieve opening 25 μm) is more than 50 ppm based on the composition, it becomes impossible to fully reduce the thickness of a layer of the composition below a sufficient level to provide a desired heat dissipating effect. Thus the fraction of coarse particles on 500 mesh should be equal to or less than 50 ppm, and preferably equal to or less than 30 ppm based on the weight of the composition. Even when the fraction of coarse particles on 500 mesh is equal to or less than 50 ppm, there is still a possibility that a few large or coarse particles be present in the composition. Then it is impossible to fully reduce the thickness of a layer of the composition below a sufficient level to provide a desired heat dissipating effect. To achieve the desired heat dissipating effect, a fraction of coarse particles on 325 mesh (sieve opening 45 μm) must be substantially zero.

Coarse particles can be removed from the silicone grease composition by directly sieving the composition through a 500-mesh sieve (sieve opening 25 μm). In practice, however, it is difficult to sieve the silicone grease composition heavily loaded with the heat conductive filler. It is thus recommended to remove coarse particles from the heat conductive filler, component (B) or components (C-1) and (C-2) prior to compounding, as previously described.

As mentioned above, the silicone grease compositions of the first and second embodiments have to satisfy that a fraction of coarse particles on 500 mesh (sieve opening 25 μm) be not more than 50 ppm based on the composition and a fraction of coarse particles on 325 mesh (sieve opening 45 μm) be substantially zero.

The weight of coarse particles in a silicone grease composition is measured by dissolving an aliquot of the composition in a solvent capable of dissolving the silicone value such as toluene, passing the solution through a 325-mesh sieve (sieve opening 45 μm) and then a 500-mesh sieve (sieve opening 25 μm), and fully washing the sieves. The residue or oversize on the 325-mesh sieve is visually observed. The residue on the 500-mesh sieve is dried and collected on a powder paper sheet whereupon its weight is measured.

When the silicone grease composition, especially the heat dissipating silicone grease composition of the first embodiment is applied between hard substrates like metal plates as a layer having a thickness of 75 μm and compressed under a pressure of 0.15 MPa over 15 minutes, the layer readily thins down to a thickness of 25 μm or less, especially 20 μm or less. In a common practice, a silicone grease composition is applied between a heat-generating component and a heat sink, and the heat sink is forcedly attached to the component by means of clips or the like. Under the current trend to reduce the size and weight of equipment, however, it is difficult to use a structure capable of strongly urging the heat sink to the component. Then, a desired heat dissipation cannot be achieved unless the silicone grease composition becomes fully thin even under low pressure.

The silicone grease compositions of the first and second embodiments should preferably have a viscosity of not more than 1,000 Pa·s at 25° C., and more preferably not more than 500 Pa·s at 25° C. because less flowing compositions have poor dispensability. As used herein, the dispensability indicates ease of operation when the silicone grease composition is applied to substrates. Poor dispensability means that it is difficult to dispense the composition from a syringe or dispenser having an extrusion means and to apply the composition thinly to substrates. The lower limit of composition's viscosity is preferably at least 10 Pa·s, especially at least 100 Pa·s at 25° C., though not critical.

Also, the silicone grease composition, especially the heat dissipating silicone grease composition of the second embodiment should preferably have a thermal resistance of not more than 6 mm²·K/W, and more preferably not more than 4 mm²·K/W, as measured at 25° C. by the laser flash method. A composition with a thermal resistance of more than 6 mm²·K/W may be inadequate in applying to heat-generating components having a substantial heat release.

The silicone grease compositions of the invention have advantages of a drastically improved thermal conductivity and ease of application.

EXAMPLE

Examples of the invention are given below by way of illustration and not by way of limitation. In Examples, the average particle size is a cumulative average particle size (or median diameter) as measured by a particle size analyzer model MT3000 of Microtrac, Inc., and the kinematic viscosity is measured at 25° C. by an Ostwald viscometer.

Examples 1-5 and Comparative Examples 1-5

Heat dissipating silicone grease compositions were prepared by using components (A) and (B) identified below, feeding them in amounts as shown in Tables 1 and 2 to a 5-liter planetary mixer (trade name of Inoue Mfg. Inc.), and agitating them at room temperature for one hour. The properties of these silicone grease compositions were measured by the methods identified below, with the results shown in Tables 1 and 2.

Component (A)

A-i: organopolysiloxane of the formula below having a kinematic viscosity of 390 mm²/s

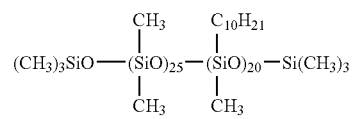

A-ii: organopolysiloxane of the formula below having a kinematic viscosity of 500 mm²/s

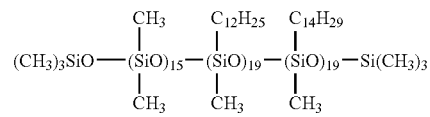

Component (B)

B-i: aluminum powder, thermal conductivity 237 W/m° C., average particle size 1.9 μm, 500-mesh pass product B-ii: zinc oxide powder, thermal conductivity 54 W/m° C., average particle size 0.3 μm, pneumatically classified product B-iii: copper powder, thermal conductivity 398 W/m° C., average particle size 6.9 μm, pneumatically classified product B-iv: aluminum powder, thermal conductivity 237 W/m° C., average particle size 6.5 μm, not classified B-v: copper powder, thermal conductivity 398 W/m° C., average particle size 7.2 μm, not classified Preparation of Test Piece A layer of silicone grease composition having a thickness of 75 μm was sandwiched between a pair of aluminum disks having a diameter of 12.6 mm and a thickness of 1 mm. A pressure of 0.15 MPa was applied to the layer over 15 minutes, completing a test piece.

Viscosity

The viscosity of a silicone grease composition was measured at 25° C. by a Malcom viscometer type PC-1T.

Thickness of Silicone Grease Composition

The overall thickness of the test piece was measured by a micrometer (Mitsutoyo Co., Ltd.). The thickness of the compressed silicone grease composition layer was computed by subtracting the thickness of two aluminum disks from the overall thickness.

325-Mesh Sieve (Opening 45 μm) Oversize

A 200-ml plastic bottle was charged with 50 g of a silicone grease composition and 100 g of toluene, closed with a plug, and shaken until the silicone grease composition was thoroughly dispersed. The dispersed liquid was poured on a 325-mesh sieve (opening 45 μm), which was fully washed with toluene. The sieve was placed in a drier and dried. The dry oversize (coarse particles) on the 325-mesh sieve was transferred onto a powder paper sheet, and visually observed. The sample was rated "nil" when no coarse particles were visually detected and "present" when one or more coarse particles were visually detected.

500-Mesh Sieve (Opening 25 μm) Oversize

A 200-ml plastic bottle was charged with 50 g of a silicone grease composition which was rated "nil" in the 325-mesh sieve oversize test (i.e., no coarse particles detected) and 100 g of toluene, closed with a plug, and shaken until the silicone grease composition was thoroughly dispersed. The dispersed liquid was poured on a 500-mesh sieve (opening 25 μm), which was fully washed with toluene. The sieve was placed in a drier and dried. The dry oversize (coarse particles) on the 500-mesh sieve was transferred onto a powder paper sheet, and weighed. The amount (ppm) of the 500-mesh oversize coarse particles relative to the silicone grease composition was computed.

Thermal Resistance

After the thickness of the compressed silicone grease composition layer was determined, the thermal resistance of the silicone grease composition was measured using the test piece and an analyzer model Microflash 300 of Holometrix Micromet Inc.

TABLE 1

| Formulation | | Example | | | | |
|---|---|---|---|---|---|---|
| (pbw) | | 1 | 2 | 3 | 4 | 5 |
| Component A | A-i | 140 | 35 | — | 60 | 150 |
| | A-ii | — | — | 120 | — | — |
| Component B | B-i | 700 | 100 | 500 | — | 850 |
| | B-ii | 160 | 65 | 380 | 100 | — |
| | B-iii | — | 800 | — | 840 | — |

TABLE 1-continued

| Formulation | Example | | | | |
|---|---|---|---|---|---|
| (pbw) | 1 | 2 | 3 | 4 | 5 |
| Test results | | | | | |
| Viscosity (Pa · s) | 350 | 420 | 360 | 250 | 400 |
| Grease thickness (μm) | 10 | 17 | 11 | 17 | 10 |
| 325-mesh oversize (visual observation) | nil | nil | nil | nil | nil |
| 500-mesh oversize (ppm) | 20 | 25 | 15 | 20 | 10 |
| Thermal resistance (mm² · K/W) | 5 | 4 | 6 | 7 | 7 |

TABLE 2

| Formulation | | Comparative Example | | | | |
|---|---|---|---|---|---|---|
| (pbw) | | 1 | 2 | 3 | 4 | 5 |
| Component A | A-i | 10 | 450 | 140 | 60 | 150 |
| Component B | B-i | 990 | 550 | — | — | — |
| | B-ii | — | — | — | 100 | — |
| | B-iii | — | — | 700 | — | 85 |
| | B-iv | — | — | 160 | 840 | — |
| Test results | | | | | | |
| Viscosity (Pa · s) | | not grease-like | 30 | 280 | 260 | 320 |
| Grease thickness (μm) | | | 11 | 45 | 42 | 51 |
| 325-mesh oversize (visual observation) | | | nil | present | present | present |
| 500-mesh oversize (ppm) | | | 30 | 110 | 60 | 80 |
| Thermal resistance (mm² · K/W) | | | 25 | 29 | 24 | 32 |

Examples 6-10 and Comparative Examples 6-10

Heat conductive silicone grease compositions were prepared by the procedure described below, using the components identified below.

Component (A)

A-i: organopolysiloxane of the formula below having a kinematic viscosity of 390 mm²/s

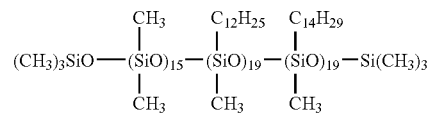

A-iii: organopolysiloxane of the formula below having a kinematic viscosity of 600 mm²/s

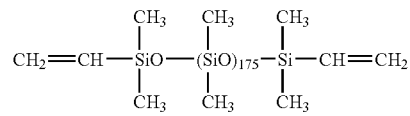

Component (C-1)

C-1-i: copper powder, average particle size 10.1 μm, pneumatically classified product, oxygen content 0.03 wt %

C-1-ii: copper powder, average particle size 10.1 μm, pneumatically classified product, oxygen content 1.4 wt %

C-1-iii: copper powder, average particle size 12.3 μm, not classified, oxygen content 0.2 wt %

The oxygen content of component (C-1) was measured according to the inert gas fusion-IR spectroscopy of JIS Z2613. The analyzer used was an oxygen/nitrogen analyzer EMGA-523 by Horiba Mfg. Co., Ltd.

Component (C-2)

C-2-i: aluminum powder, average particle size 1.4 μm, 500-mesh pass product

C-2-ii: zinc oxide powder, average particle size 0.5 μm, pneumatically classified product C-2-iii: aluminum powder, average particle size 6.5 μm, not classified Component (D)

D-i: alkoxysilane of the formula below $$C_{10}H_{21}Si(OCH_3)_3$$

D-ii: hydrolyzable methylpolysiloxane of the formula below $$CH_3-(SiO)_{30}-Si(OCH_3)_3 \text{ with } CH_3, CH_3 \text{ side groups}$$

Preparation

Heat conductive silicone grease compositions were prepared by weighing components (A) to (D) in the amounts shown in Tables 3 and 4, feeding them to a planetary mixer (Inoue Mfg. Inc.)., and agitating them at room temperature for one hour.

Tests

The properties of these silicone grease compositions were measured by the methods identified below, with the results shown in Tables 3 and 4.

Preparation of Test Piece

A layer of silicone grease composition having a thickness of 75 μm was sandwiched between a pair of aluminum disks having a diameter of 12.6 mm and a thickness of 1 mm. A pressure of 0.15 MPa was applied to the layer over 60 minutes, completing a test piece.

Viscosity

After a silicone grease composition was held in a thermostat chamber at 25° C. for 24 hours, its viscosity was measured by a Malcom viscometer at 10 rpm.

Otherwise the thickness, thermal resistance, 325-mesh sieve oversize and 500-mesh sieve oversize of a silicone grease composition were determined as in Example 1.

TABLE 3

| Formulation | | Example | | | | |
|---|---|---|---|---|---|---|
| (vol %) | | 6 | 7 | 8 | 9 | 10 |
| Component A | A-i | 18.6 | 22.6 | 18.8 | 20.0 | — |
| | A-iii | — | — | — | — | 21.6 |
| Component C-1 | C-1-i | 51.0 | 69.0 | 55.9 | 49.7 | 50.0 |
| Component C-2 | C-2-i | 21.8 | — | 23.9 | 21.3 | 20.8 |
| | C-2-ii | 7.2 | 7.0 | — | 7.2 | 6.2 |
| Component D | D-i | 1.4 | 1.4 | 1.4 | — | 1.4 |
| | D-ii | — | — | — | 1.8 | — |
| Test results | | | | | | |
| Viscosity (Pa·s) | | 420 | 441 | 403 | 388 | 357 |
| Grease thickness (μm) | | 18 | 20 | 20 | 18 | 16 |
| 325-mesh oversize (visual observation) | | nil | nil | nil | nil | nil |
| 500-mesh oversize (ppm) | | 17 | 19 | 18 | 14 | 18 |
| Thermal resistance (mm²·K/W) | | 3.6 | 5.6 | 4.3 | 5.1 | 4.9 |

TABLE 4

| Formulation | | Comparative Example | | | | |
|---|---|---|---|---|---|---|
| (vol %) | | 6 | 7 | 8 | 9 | 10 |
| Component A | A-i | 5.0 | 48.5 | 22.0 | 18.6 | 22.6 |
| Component C-1 | C-1-i | 91.0 | 34.2 | — | — | 48.5 |
| | C-1-ii | — | — | 48.7 | — | — |
| | C-1-iii | — | — | — | 51.0 | — |
| Component C-2 | C-2-i | — | 7.3 | 20.9 | 21.8 | — |
| | C-2-ii | 3.0 | 9.0 | 7.1 | 7.2 | 6.8 |
| | C-2-iii | — | — | — | — | 20.8 |
| Component D | D-i | 1.0 | 1.0 | 1.3 | 1.4 | 1.3 |
| Test results | | | | | | |
| Viscosity (Pa·s) | | not grease-like | 121 | 368 | 324 | 366 |
| Grease thickness (μm) | | | 17 | 23 | 71 | 54 |
| 325-mesh oversize (visual observation) | | | nil | nil | present | present |
| 500-mesh oversize (ppm) | | | 11 | 42 | — | — |
| Thermal resistance (mm²·K/W) | | | 9.1 | 7.8 | 16.0 | 17.2 |

Japanese Patent Application Nos. 2004-151706 and 2004-299616 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone grease composition comprising
   (A) 2 to 40% by weight of an organopolysiloxane of the average compositional formula (1):

$$R^1_a SiO_{(4-a)/2} \tag{1}$$

wherein $R^1$ is independently a monovalent $C_1$-$C_{18}$ hydrocarbon group, and "a" is a positive number from 1.8 to 2.2, having a kinematic viscosity of 50 to 500,000 mm²/s at 25° C., and
   (B) 60 to 98% by weight of at least one heat conductive filler selected from the group consisting of metal powders, metal oxide powders and ceramic powders, the filler having a thermal conductivity of at least 10 W/m° C. and an average particle size of 0.1 to 15.0 μm,
   wherein a fraction of coarse particles on 500 mesh (sieve opening 25 μm) is not more than 50 ppm based on said composition and a fraction of coarse particles on 325 mesh (sieve opening 45 μm) is substantially zero.

2. The silicone grease composition of claim 1, wherein when the composition having a thickness of 75 μm is compressed under a pressure of 0.15 MPa for 15 minutes, its thickness becomes equal to or less than 25 μm.

3. A silicone grease composition comprising
   (A) 10 to 60% by volume of an organopolysiloxane of the average compositional formula (1):

$$R^1_a SiO_{(4-a)/2} \tag{1}$$

wherein $R^1$ is independently a monovalent $C_1$-$C_{18}$ hydrocarbon group, and "a" is a positive number from 1.8 to 2.2, having a kinematic viscosity of 50 to 100,000 mm²/s at 25° C., and
   (C-1) 40 to 90% by volume of a copper powder having an average particle size of 5.0 to 15.0 μm and containing not more than 0.1% by weight of oxygen,
   wherein a fraction of coarse particles on 500 mesh (sieve opening 25 μm) is not more than 50 ppm based on said composition and a fraction of coarse particles on 325 mesh(sieve opening 45 μm) is substantially zero.

4. The silicone grease composition of claim 3, wherein $R^1$ in formula (1) contains an alkyl group of 6 to 18 carbon atoms.

5. The silicone grease composition of claim 3, further comprising (C-2) 1 to 35% by volume of a heat conductive filler other than component (C-1)having an average particle size of 0.1 to 5.0 μm.

6. The silicone grease composition of claim 3, further comprising (D-1) an alkoxysilane having the general formula (2):

$$R^2{}_b R^3{}_c Si(OR^4)_{4-b-c} \qquad (2)$$

wherein $R^2$ is a $C_9$-$C_{15}$ alkyl group, $R^3$ is a monovalent $C_1$-$C_8$ hydrocarbon group, $R^4$ is a $C_1$-$C_6$ alkyl group, b is an integer of 1 to 3, c is an integer of 0 to 2, and the sum of b+c is an integer of 1 to 3.

7. The silicone grease composition of claim 3, further comprising (D-2) a one end-trifunctional, hydrolyzable methylpolysiloxane having the general formula (3):

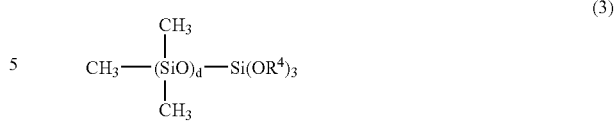

wherein $R^4$ is a $C_1$-$C_6$ alkyl group and d is an integer of 5 to 100.

8. The silicone grease composition of claim 3, having a viscosity of not more than 1,000 Pa·s at 25° C.

9. The silicone grease composition of claim 3, having a thermal resistance of not more than 6 mm$^2$·K/W as measured at 25° C. by the laser flash method.

10. The silicone grease composition of claim 1, wherein when the composition having a thickness of 75 μm is compressed under a pressure of 0.15 MPa for 15 minutes, its thickness becomes equal to or less than 23 μm.

11. The silicone grease composition of claim 3, wherein when the composition having a thickness of 75 μm is compressed under a pressure of 0.15 MPa for 15 minutes, its thickness becomes equal to or less than 23 μm.

* * * * *